United States Patent [19]
Dillon

[11] Patent Number: 5,539,377
[45] Date of Patent: Jul. 23, 1996

[54] VEHICLE SECURITY SYSTEM

[76] Inventor: John A. Dillon, 49465 Pointe Crossing, Plymouth, Mich. 48170

[21] Appl. No.: 28,660

[22] Filed: Mar. 9, 1993

[51] Int. Cl.$^6$ .................................................. B60R 25/10
[52] U.S. Cl. ...................... 340/426; 340/425.5; 340/430; 307/10.2; 307/10.3; 307/10.6
[58] Field of Search .............................. 340/426, 425.5, 340/428–430; 307/10.2, 10.3, 10.6

[56] References Cited

U.S. PATENT DOCUMENTS

| | | | |
|---|---|---|---|
| 4,107,543 | 8/1978 | Kaplan | 340/428 |
| 4,792,792 | 12/1988 | Costino | 340/426 |
| 4,887,064 | 12/1989 | Drori et al. | 340/426 |
| 5,172,094 | 12/1992 | Stadler | 307/10.2 |

FOREIGN PATENT DOCUMENTS 0242099  10/1987  European Pat. Off. ............... 340/426

Primary Examiner—Donnie L. Crosland

[57] ABSTRACT

Vehicle security protection system provides anti-theft security system for the voluntary vehicle vacate situation, regardless of whether the engine is running. When a thief trips the armed system, the engine ignition circuit is instantaneously and continuously broken at the vehicle's engine ignition module. The system is difficult to hot-wire or to reset. An anti-hijack security protection system is also provided which can interface with the anti-theft system. Either system can be "armed" regardless of engine status. However, the user must be in the vehicle before arming the anti-hijack system because the door/courtesy light circuit is used as the trigger circuit for engine kill. A time delay is provided in the anti-hijack mode to cause the thief to commit to public actions and to give the owner time to escape from the hijack scene. In either mode, when the system is tripped, the fuel gauge indicates an empty tank condition.

34 Claims, 5 Drawing Sheets

VEHICLE SECURITY SYSTEM

BACKGROUND OF THE INVENTION

The present invention relates to motor vehicle security systems.

In a common type of prior art motor vehicle anti-theft security system, the system is sequenced into an "armed" mode after the engine is stopped, the vehicle parked, and the user exits the vehicle and closes all of the doors. This system detects tampering/illegal entry by sensing a voltage on the door/courtesy light circuit or by a vibration/position sensor, which triggers an annoying alarm and causes interruption of the engine starter circuit. Such alarm is typically announced via flashing lights, honking horn or siren. However, these systems are prone to false alarms, which create unnecessary noise pollution, and can even be the subject of expensive traffic fines in some municipalities.

The typical system of the above type must be disarmed prior to vehicle reentry in order to avoid triggering the alarm, and the starter circuit will not function until the system is disarmed. Typically the vehicle user is able to arm or disarm the security system by means of a coded, hand-held, RF transmitter. These RF devices require a high degree of security coding in order to prevent their codes from being broken by code-scanning devices. Alternatively, some systems automatically arm/disarm according to use of the ignition key to start or stop the engine.

The typical prior art system includes an electronic control module which is installed under the dash board adjacent to the steering column and is connected to the keyed ignition switch. This arrangement is typically rather easy to jumper (hot-wire). This control module typically has a starter circuit interrupt device which is spliced in series with the starter circuit between the starter relay and the ignition switch. As well, because such starter interrupt is fairly easy to defeat by hot-wiring at the ignition switch or over the cutout device, the better prior art systems include a self-holding cutout relay located in the engine compartment. In the latter case, when the armed system is triggered, the thief cannot defeat the system from inside of the vehicle; rather, the thief must open the hood of the vehicle engine compartment and defeat the interrupt. While the thief may still be able to directly hot-wire the starter and thus to defeat a starter circuit interrupt in the engine compartment, it is believed that the average thief will not have the time for such extra attention attracting activity in defeating the interrupt. A hood lock may be installed to further foil the thief.

Still furthermore, vehicle hijacking is now a present concern in some cities. In the typical situation, the authorized user-motorist is pulled from the vehicle after the user has disarmed the security system and has started the engine. Now the thief can drive the vehicle away without concern about triggering an armed security system and without the need for hot-wiring.

It is therefore an object of the present invention to provide a vehicle security system which is difficult to defeat.

It is another object of the present invention to provide a security system which can protect against vehicle hijacking.

SUMMARY OF THE INVENTION

One embodiment of the present invention provides increased vehicle anti-theft security and reduces false alarms by eliminating alarmed announcements, by distributing system functions in a hard to defeat manner, by eschewing conventional ignition key/starter cutout circuits, and by elimination of hand-held RF communications. In a preferred embodiment of the invention, an anti-hijack security protection system is provided which protects a vehicle from unauthorized entry after the anti-theft security system has been disarmed or in a vehicle without anti-theft security. Either security system can be armed regardless of engine status.

The basic anti-theft system components include: an indicator (such as an LED), a user interface device (such as a hidden microswitch or a key pad), trigger circuit(s), an engine ignition kill relay module, and a main control module (including the main i/o interconnect and logic control board). A preferred system of the invention additionally includes an anti-hijack module and an anti-hijack LED. In a combined anti-theft/anti-hijack system, all components are coupled to the main control module, and are preferably packaged to match the appearance of factory-installed automotive modules.

In the anti-theft system, the LED is mounted in view within the vehicle, such as on the dashboard. The user interface, e.g., a microswitch, is hidden in a concealed location within the vehicle although accessible to the driver, and is connected to the user input of the main control module. Preferably the microswitch is color-matched according to the surface in which it is mounted, even if it is to be hidden from view. The main control module is mounted under the dashboard along side other factory modules. A wiring harness runs from the main control module to the ignition kill relay module. The ignition kill relay module is wired in series with the vehicle ignition command circuit between the vehicle's electronic brain (engine microprocessor) and the vehicle's electronic ignition module. The ignition kill relay module is energized by an unauthorized event signal from the main control module, and when energized, interrupts the computer ignition command signal to the electronic ignition module when the armed anti-theft system is tripped.

The ignition kill relay module is configured and installed so as to be difficult to locate and disable. In most if not all vehicles, the location and identity of the vehicle's electronic ignition module and engine microprocessor is somewhat obscure, or non-obvious, and with many wires running here and there, this make a relatively difficult venue for hot-wiring within the time constraints a thief is ordinarily facing. Yet continuous receipt of the control signal from the engine microprocessor is essential for continued ignition and operation of the engine. Thus, unless this specific breach in the engine-microprocessor-to-engine-ignition-module circuit at the disguised and hidden ignition kill relay module is found in a timely fashion, the thief will be foiled.

The anti-theft system makes use of any one or all of a limited set of specified vehicle warning circuits to detect an unauthorized event. These specified circuits include brake switch, emergency brake switch, back-up switch, park/neutral switch, and/or clutch switch, and the unauthorized event(s) are the use of any of these circuits before the armed anti-theft security system is disarmed. These circuits are referred to herein as "anti-theft unauthorized-event trigger circuits."

The anti-theft system is armed via the user interface, such as the driver depressing a hidden microswitch until the LED indicates the "system armed" status (e.g., LED is flashing red light). This armed status means that the anti-theft security system is ready to break the engine ignition circuit at the ignition kill relay module upon an unauthorized event, i.e., upon sensing a voltage change in any of the anti-theft unauthorized-event trigger circuits. Examples of such unauthorized events include: the thief releases the emergency brake or steps on the brake pedal, or attempts to put the car into gear by depressing the clutch or by shifting out of park/neutral, prior to disarming the anti-theft security system. The unauthorized-event trigger signal is immediately sensed by the main control module, which in turn immediately trips the ignition kill relay module, thus interrupting the vehicle ignition circuit and immediately killing the engine.

The ignition kill relay module may be provided with an auxiliary integrity circuit which senses the integrity of its connection to the main control module. If this circuit is broken, then the ignition kill relay module is thrown into the ignition kill condition until the system is repaired or is disengaged. The ignition kill relay module may be provided with a by-pass pin-out which enables the user to by-pass the ignition kill circuit in the event of system malfunction. For security purposes, access to the by-pass is limited and obstructed in order to delay the intruder who attempts to foil the system. As a further precaution, a hood lock may be installed to impede access of the intruder to the engine compartment.

The user interface can be hidden (e.g., a hidden microswitch) and/or secure (e.g., requiring entry of a code via a digital touch pad), to prevent a thief from disarming or resetting the system. A reset button is accessible on the main control module, but the system must first be cycled to the off condition (LED off) using the user interface before the reset button is depressed to reset the system and to release the engine kill. This arrangement will further foil the typical thief by using unconventional logic. Furthermore, it is believed that a disguisable system interface which can be located anywhere in a vehicle according to owner preference is the most effective initial deterrent to vehicle theft.

In use, the vehicle is brought to a stop and the transmission is disengaged (i.e., it is shifted into "park" or "neutral"), and the emergency brake is preferably engaged. Thereafter the driver engages the anti-theft system by manually selecting the "anti-theft armed" condition (e.g., by depressing the hidden user-interface microswitch until the LED indicates "anti-theft armed" status by flashing red light). Now the anti-theft system is armed.

Thus, upon reentry into the vehicle, the authorized user cycles the system using the user interface until the LED is off, to avoid engine kill. If the system already has been tripped, then the reset procedure must be followed, i.e., the system is cycled to the off condition using the user interface and then the reset button on the main control module is depressed to complete the reset.

The vehicle ignition key/switch circuit is not used as part of either the anti-theft or anti-hijack security system. This enables the anti-theft system of the invention to be fully operational even when the vehicle is intentionally vacated with the engine running. For example, it may be desirable to leave a vehicle with its engine running while the user makes a short visit to a market or to close the garage door, or to return to the house while the heater warms up. In such a situation, reentry of the vehicle should not cause engine kill, and yet an unauthorized entrant should not be able to make off with the vehicle, or even move it. The authorized user can return to the vehicle and can reset the security system using the user interface before tripping an anti-theft unauthorized-event trigger circuit (e.g., before stepping on the brake petal or putting the car into gear) thus avoiding engine kill. Yet the unauthorized entrant thief will kill the engine before or as soon as attempting to move the vehicle by tripping one of the anti-theft unauthorized-event trigger circuits.

It is a further feature of the invention that the engine starter circuit is not interrupted, whereby, once the anti-theft or the anti-hijack system is triggered and the engine ignition is killed, the thief will be able to engage the starter circuit in an attempt to restart the engine. But the engine will not start because the ignition remains interrupted at the engine ignition kill relay module. This causes the thief to attract attention and waste time. And to further confuse and foil the thief, both the anti-theft and the anti-hijack systems provide for a fuel gauge "empty" reading once an unauthorized event is detected. The fuel gauge is restored to normal operation when the system is turned off or reset.

The door and/or courtesy light circuits are not used for triggers in the anti-theft mode, so that reentry to the vehicle does not cause engine kill, but they do constitute "anti-hijack unauthorized-event trigger circuits". In the anti-hijack security protection system of the invention, the involuntary vehicle vacate situation is protected. The anti-hijack module is installed between the anti-theft unauthorized-event trigger circuits and the main control module. The anti-hijack module is also installed between the user interface (e.g., the hidden microswitch) and the main control module. An anti-hijack LED is also provided. When the anti-theft system is on, the anti-hijack system is off, and in which condition the anti-hijack module passes the anti-theft unauthorized-event trigger signals to the main control module without interruption. When the anti-hijack system is energized, the anti-theft system is deenergized and the anti-theft unauthorized-event trigger signals are not conveyed to the main control module, while the anti-hijack module connects the anti-hijack unauthorized-event trigger circuits (door/courtesy light) to the main control module.

To arm the anti-hijack system, i.e., to set it in anti-hijack protection ready mode, the system is cycled via the user interface (i.e., the same hidden microswitch as used in the anti-theft system) until obtaining a flashing green indication on the anti-hijack LED, which indicates that the anti-hijack system is armed (and that the anti-theft system is disarmed). Once armed, the anti-hijack system awaits a trigger signal from the anti-hijack unauthorized-event trigger circuits (door/courtesy light). Normal vehicle operation is permitted, i.e., it is possible to start the engine and to drive the car indefinitely without triggering engine kill.

When the anti-hijack system is armed, door opening is detected as an anti-hijack unauthorized-event which triggers an anti-hijack engine kill delay timer in the anti-hijack module. If the system is not reset by using the user interface (e.g., the microswitch) within the preset anti-hijack time delay period, then the anti-hijack module at the end of the time delay issues an anti-hijack unauthorized event trigger signal to the above-described main control module. The main control module now treats this anti-hijack unauthorized event trigger signal the same as if it were an anti-theft unauthorized-event trigger signal, immediately energizing the ignition kill relay module and causing engine kill.

The purpose of the preset anti-hijack time delay is to give the vehicle user time to escape from the scene of a hijack event before the hijacker is foiled and then perhaps becomes violent. Preferably a main portion of the time delay is not obviously signaled, which usually results in the thief committing to public action (e.g., driving onto the roadway) before being subjected to engine kill. This is likely to cause the thief to abandon the vehicle, even if the thief first attempts to restart the engine several times (which again will attract attention to the situation). This defeats the thief's "quick snatch and get-away" approach, by causing unwanted time delay and public attention. As well, the fuel gauge now will give an "empty fuel tank" indication, for further confusion of the thief.

However, as a convenience to the authorized user, an anti-hijack engine-kill warning buzzer is optionally provided, which can be set to sound at the start of the preset anti-hijack time delay. This buzzer is disguised to sound like a conventional audible vehicle warning buzzer. Typically the thief will attempt to steal a vehicle without buckling his seat belt or paying attention to the conventional audible vehicle warning devices, and thus will accept the blaring of a warning buzzer in his haste to vacate the scene. Since the anti-hijack warning buzzer can be made to sound like a conventional warning device, such as a seat belt warning buzzer, the thief will likely think that the buzzer is just a conventional vehicle warning buzzer, and perhaps will ignore same. However, in the normal driving situation, the owner will know that the continuing warning buzzer indicates that the anti-hijack system is engaged and has been tripped and must be reset before the end of the time delay to avoid engine kill. This facilitates the thief committing to public action without obvious warning of the presence of the anti-hijack system, and yet still enables the authorized used to reset the system using the user interface before unwanted engine kill.

As will now be appreciated, the anti-theft security protection system of the invention provides anti-theft security for the conventional voluntary vehicle vacate situation. When a thief trips the armed anti-theft system, the engine ignition circuit is instantaneously and continuously broken at the vehicle's engine ignition module. The system is difficult to hotwire or to reset. Meanwhile, in the anti-hijack security protection mode of the invention, the involuntary vehicle vacate situation is protected. Both the anti-theft system and the anti-hijack system can be "armed" regardless of engine status, however, the user must be in the vehicle before arming the anti-hijack system because the door/courtesy light circuit is used as the trigger circuit for engine kill in this mode.

BRIEF DESCRIPTION OF THE DRAWINGS

These and other features and advantages of the present invention will be more fully understood by reference to the following detailed description in conjunction with the attached drawing in which like reference numerals refer to like elements and in which.

DETAILED DESCRIPTION OF ILLUSTRATIVE EMBODIMENTS

Figure 1:
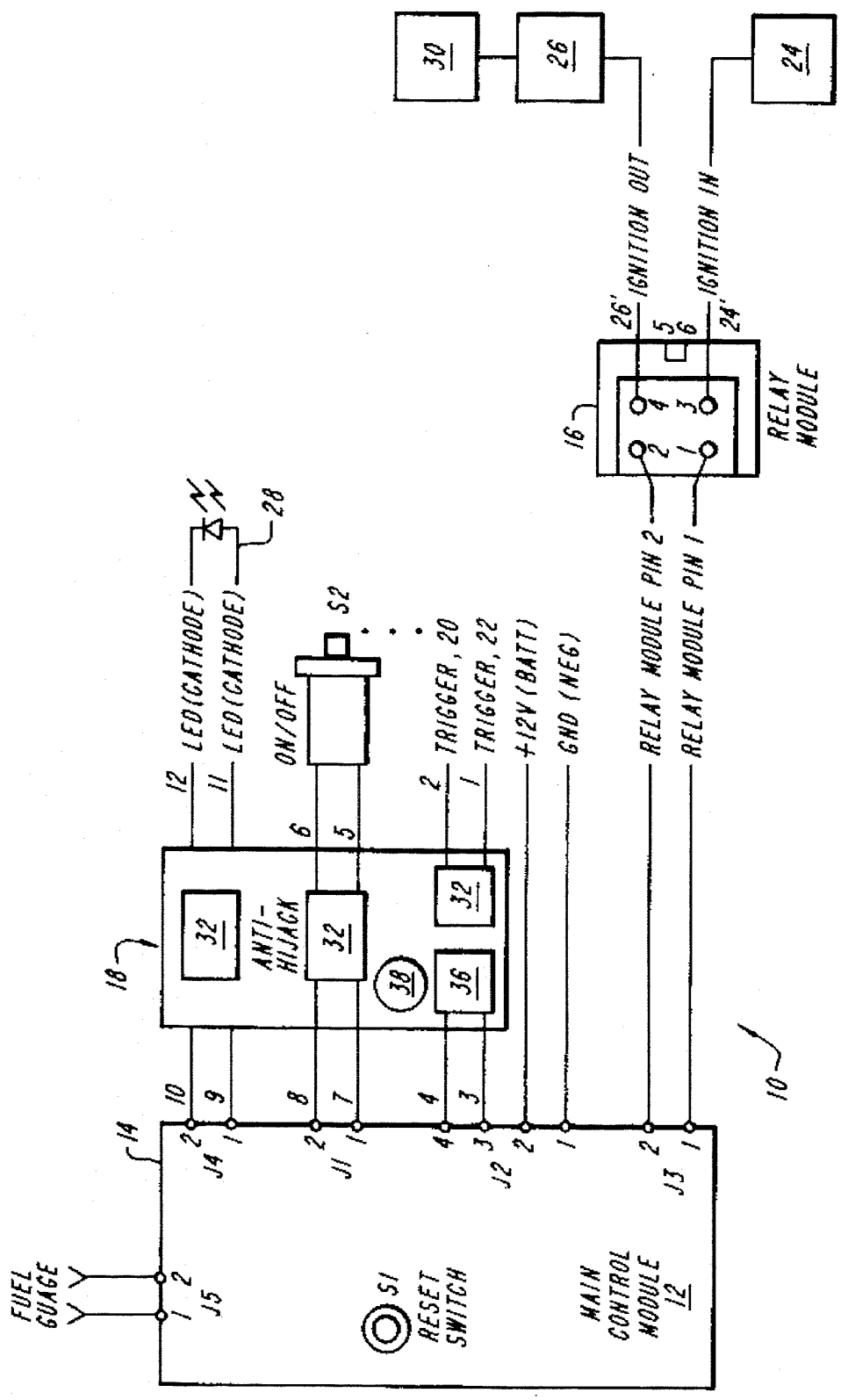
FIG. 1 is a block diagram of a preferred anti-theft and anti-hijack embodiment of the invention.

FIG. 1 is a block diagram of an embodiment 10 of the invention for providing both anti-theft and anti-hijack protection. Main control module 12 is mounted under the dashboard, and is provided with a reset switch S1 mounted to module housing 14. Main control module 12 is controlled via user interface momentary microswitch S2 and cooperates with relay module 16 for causing engine-kill upon detection of a trigger event. Anti-hijack module 18 is installed between the main control module 12 and a) the anti-theft unauthorized-event trigger circuits 20, b) the anti-hijack unauthorized-event trigger circuits 22, and c) the mode-cycling user interface device, S2. As more particularly set forth below, system 10 acts to interrupt the engine ignition circuit between the engine microprocessor 24 and the engine electronic ignition module 26 to provide "engine kill" when the armed system is triggered. System status is indicated by LED 28.

Selected anti-theft trigger circuit(s) are connected to anti-hijack module 18 at pin 1 thereof and anti-hijack trigger circuit(s) are connected to module 18, pin 2. The main control module 12, at jack J2, pins 3 and 4, respectively, receives trigger inputs via module 18, pin 3 or 4 from the connected trigger circuits, when triggered. The anti-theft trigger signals can be obtained by tapping into any of the vehicle brake switch, emergency brake switch, back-up switch, park/neutral switch, and/or clutch switch circuits 20 for theft protection, or by tapping into the door/courtesy light circuits 22 for hijack protection. Various other circuits may be used to trigger unauthorized entry or use of the vehicle.

A user interface device, i.e., mode-cycling, momentary microswitch S2, is coupled to main control module 12, jack J1, pins 1 and 2, via the anti-hijack module, pins 5–8. Pin 2 of jack J2 is connected to the 12 volt positive side of the battery. Pin 1 of jack J2 is connected to battery ground.

Microswitch S2 is depressed to cycle the system through its modes of operation: "off", "anti-theft", and "anti-hijack". When the anti-theft system is on, the anti-hijack system is off and the anti-hijack module passes signals on its inputs straight through to their destination without intervention. Thus in the anti-theft mode, LED 28 is coupled to pins 1 and 2 of jack J4 of the main module; as well, the anti-theft unauthorized-event trigger circuits 20 are directly through-coupled to main control module 12 at jack J4 from input pin 2 on the anti-hijack module 18 without interruption. The input from switch S2 is also coupled through the anti-hijack module to control module 12, jack J1, pins 1 and 2.

Switch S2 is used to cycle the main control module 12 and the anti-hijack module 18 simultaneously through three conditions: "anti-theft armed" and "anti-hijack" disarmed, "anti-theft disarmed" and "anti-hijack armed", and all systems "off". The main module must recognize a particular set of conditions: "anti-theft armed", "anti-theft disarmed", and system off. In order to coordinate these conditions, the anti-hijack module has a controller circuit 32. Circuit 32 interrupts the cycle input from switch S2 and which in turn issues a cycle signal to main module 12 at J1, pins 1, 2, controls the red/green/off status of LED 28, and controls coupling of the appropriate trigger inputs 20 or 22 to module 12, depending upon how the system has been cycled via switch S2.

The system initially is installed with all modes "off". A first depression of switch S2 causes controller circuit 32 to issue a cycle signal to turn the main module "on" so as to be ready to issue an engine kill signal upon detection of an unauthorized theft event; meanwhile the anti-hijack system remains disarmed and the anti-theft trigger circuit 20 is coupled to the main control module input J2 pins 3 and 4 (redundant) via module 18. Also, LED 28 is driven to emit a first color (red) to indicate "anti-theft armed" status.

A second depression of switch S2 causes circuit 32 to cycle LED 28 into its second color (green) indicative of "anti-hijack armed" status, and which also ignores the anti-theft LED drive signal from J4 pins 1,2, while at the same time, the anti-theft trigger inputs are decoupled and the anti-hijack trigger circuit input from pin 1 of module 18 can be outputted to redundant pins 3–4 of module 12 jack J2. Now an unauthorized hijack event (opening of the door) will trigger timer 36, which then issues an audible warning at transducer 38 near the end of the alarm time delay, and then issues a trigger signal to the main control module 12, jack J2, pins 3–4, to cause immediate energization of cutout relay module for engine kill.

A third depression of switch S2 causes cycle circuit 32 to issue a cycle command to jack J1 of the main module 12 to disarm the system, while also disarming the hijack module.

When the anti-hijack system is armed, the anti-theft system is therefore disarmed, since circuits 20 are disconnected by module 18 and the anti-hijack unauthorized-event trigger circuits 22 are now connected to the main module trigger circuit at jack J2, pin 3, and the LED is now driven by the anti-hijack module controller 32.

Thus the anti-theft module is operable with or without the anti-hijack module being installed, since signal adaptation is performed by the anti-hijack module 18 when installed and as needed. In a system which only has anti-theft ability, the LED may be a simple on-off, single color LED. The anti-theft only system operates consistent with the present description, but for the absence of the intervention of the anti-hijack module as herein described.

In use, when the system is cycled into the anti-theft mode, a detected trigger signal on circuits 20 will cause module 12 to energize relay module 16, thus cutting the ignition signal to the engine ignition module 26, and killing the engine ignition 30. Door open events will not be detected in this mode. When the system is cycled into the anti-hijack mode, a detected trigger signal on anti-hijack trigger circuits 22 will cause module 18 to go into a delay mode, after which it will issue a trigger signal at pin 3 to module 12, jack J2, pin 3, to cause module 12 to energize relay module 16, thus killing the engine. Releasing the emergency brake, depressing the clutch, putting the car into gear, or stepping on the brake will not be detected in this mode.

The control module, at Jack J-3, pins 1 and 2, is coupled to pins 1 and 2 of self-latching ignition cutout relay module 16. As installed, the ignition signal from the vehicle microcomputer 24, before the vehicle engine ignition module 26, is interrupted and tied via conductor 24' to pin 3 of relay module 16 and then is outputted at pin 4 of relay module 16 to the engine ignition module 26 via conductor 26'. Relay module 16 is of the self-latching type. Therefore, it must be unlatched by means of a special reset procedure. This procedure involves recycling the system to "off" condition and then depressing reset switch S1 which reverses the latch signal from J4, 1,2, and unlatches the relay.

Figure 2:
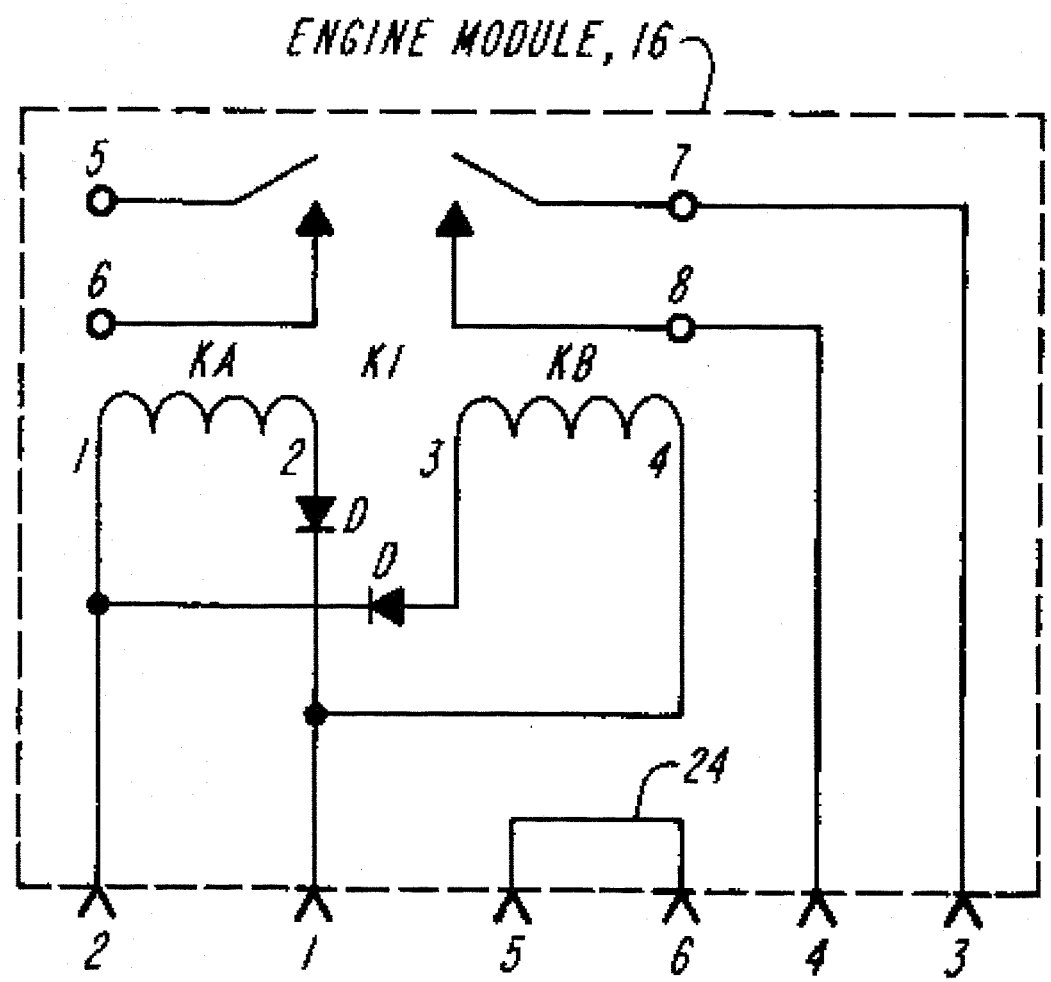
FIG. 2 is a schematic diagram of the self-latching relay module of the embodiment of FIG. 1.

In one embodiment as shown in FIG. 2, relay module 16 includes a self-latching relay K1 having two coils KA and KB. These coils are directional and in opposition, i.e., when pin 1 of module 16 is grounded and 12 volts is applied to pin 2 of module 16, the coil KA diode is forward biased and the coil is energized and the coil KB diode is reverse biased. If this polarity is reversed, the coil KA deenergizes and coil KB is energized. In this manner, control module 12 controls the polarity of the drive signal at module 16 pins 1 and 2 to latch the relay into "ignition circuit open" (engine kill) or "ignition circuit closed" (normal) modes at pins 3 and 4 of module 16. Polarity is indicated by diodes D, D of the relay module.)

Pins 5 and 6 of relay module 16 are shorted and are provided in the event of system malfunction. By removal of wires 24', 26' from pins 3,4 of relay 16 and insertion of the wires in pins 5 and 6, the ignition circuit is effectively restored to original. In order to prevent unauthorized use of this by-pass circuit, module 16 is mounted so as to limit access to these pins, thus requiring some disassembly time or at least some other inconvenience to the thief.

Figure 3:
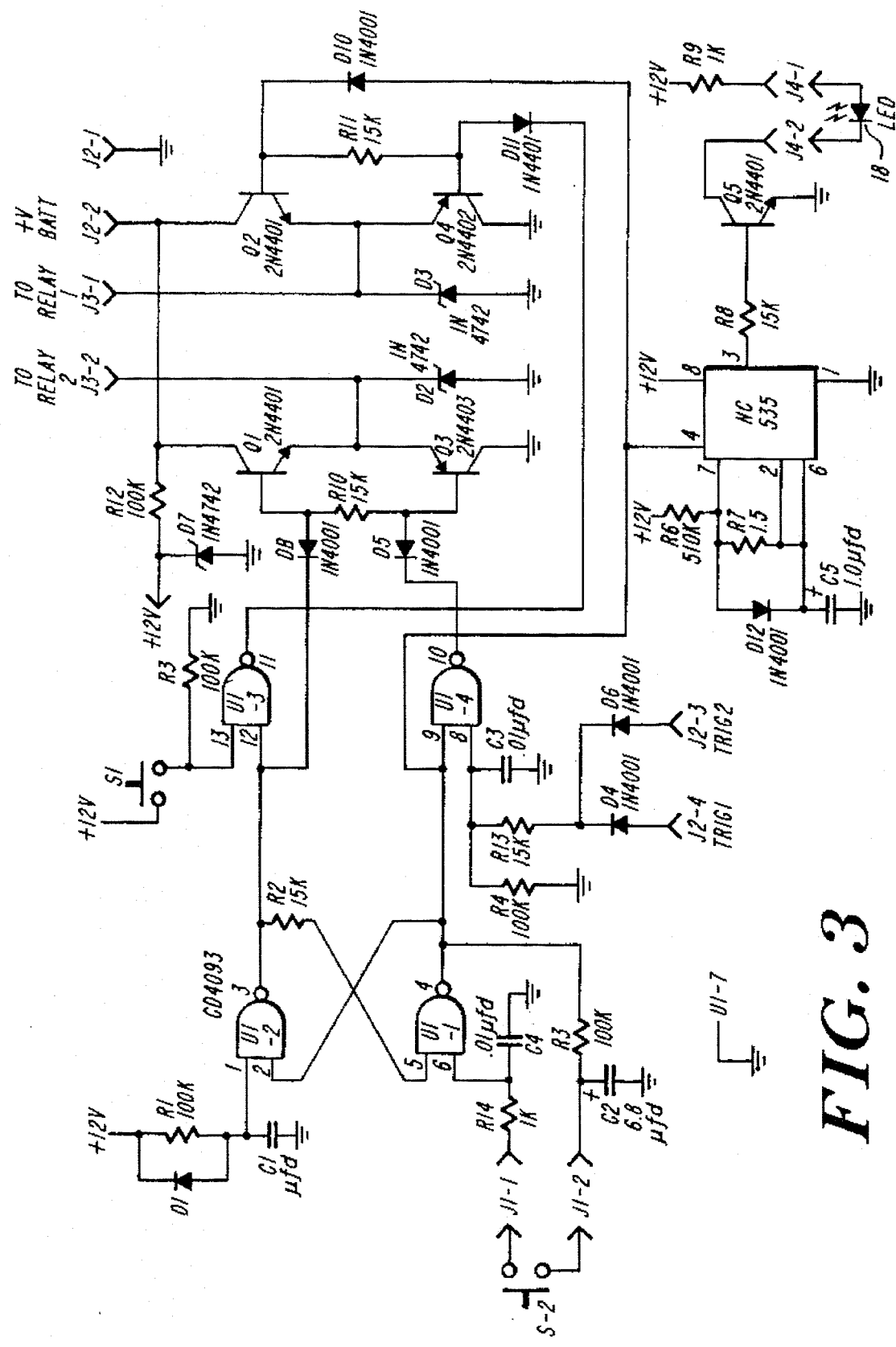
FIG. 3 is a preferred schematic diagram of an anti-theft main control module circuit of the/invention.

A schematic diagram of an illustrative anti-theft control module 12 is provided in FIG. 3 and for simplicity is described below absent the intervention of the anti-hijack module. The logic function of module 12 is performed via a CD4093 quad NAND gate IC. The first input of NAND gate U1-2 is tied to the 12 volt line and the other input is toggled by cycle switch S2. The output of U1-2 initially is positive and this is applied to the inputs of U1-1 to drive its output negative, which in turn is applied to the toggled input of U1-2. This status remains until the system-cycling momentary switch S2 is pulsed, momentarily driving the output of U1-1 high and toggling the output of U1-2 momentarily low, which in turn returns the output of U1-1 low. When the output of U1-1 is low the system is in the "off" mode and NAND gates U1-1 and U1-2 condition NAND gate U1-3 for a positive reset input from momentary reset switch S1. Depressing reset switch S1 therefore drives the output of gate U1-3 negative, applying a forward bias on the base of transistor Q4, through diode D 11. The conducting transistor pair Q2, Q4 applies a positive voltage on J3-1, which drives reset coil KB at pin 1 of module 16. The other side of coil KB is grounded via diode D2 through pin 2 of module 16 and jack J3, pin. This resets relay module 16 and restores engine ignition.

One input of NAND gate U1-4 is held positive by the output of U1-1 (unless U1-1 is toggled by momentary switch S2 to reset the system). The other input at U1-4 receives a positive trigger signal applied through the diode-conditioned inputs at J2-3 and J2-4, driving the output of U1-4 negative, biasing Q1 and Q3 into conduction and applying 12 volts via J3-2 and to coil KA at pin 2 of module 16, causing engine kill. Self-latching relay K1 remains in this state until the system is reset.

The LED driver includes a 555 timer whose output is toggled according to the output of U 1-1, just discussed.

Figure 4:
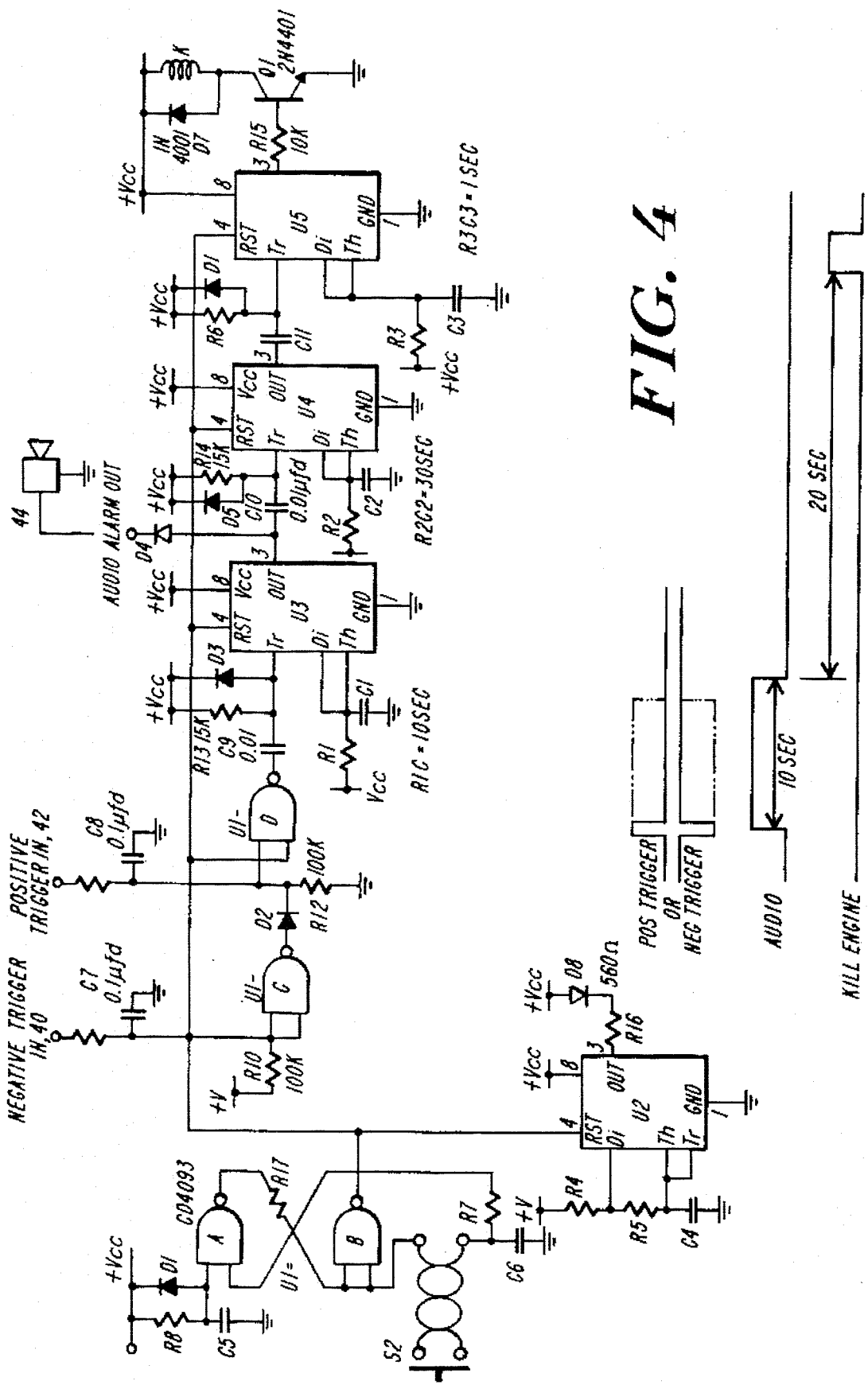
FIG. 4 i a schematic diagram of an anti-hijack embodiment of the invention.
Figure 5:
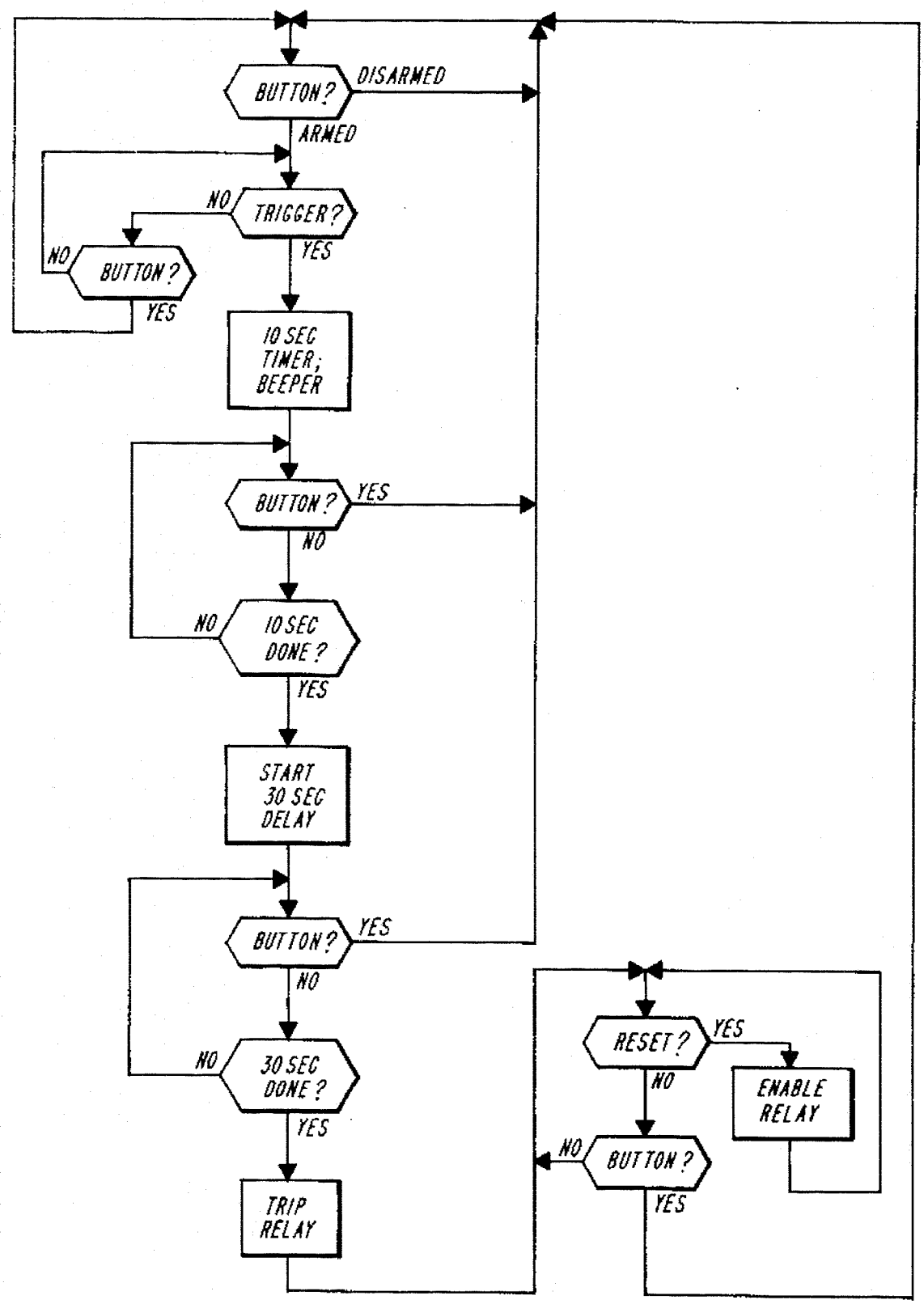
FIG. 5 is a flow chart of the invention of FIG. 4.

A preferred anti-hijack embodiment of the invention is shown in the circuit diagram of FIG. 4 and the flow chart of FIG. 5., in which circuit U1 sections A and B form a toggle flip-flop. This flip flop cycles the anti-hijack module between an armed state in which unauthorized use causes an alarm situation and a disarmed state in which unauthorized use does not matter. Resistor R8, diode D1 and capacitor C5 form a power "on" reset circuit which initializes the anti-hijack module into the disarmed state. Momentarily closing the arm/disarm push-button switch S2 cycles the flip-flop from the disarmed state to the armed state. A second depression of S2 toggles the system into the disarmed state.

When the U1-A/U1-B flip-flop is in the armed state, a stable multivibrator U2 drives indicator light emitting diode D8 at approximately two flashes per second. The time between flashes and the duration of the flashes are set by timing components R4, RS, and C4.

Also when the U1-A/U1-B flip-flop is in the armed state, trigger gates U1-C and U1-D are enabled. When U1-C is enabled, a signal making a high to low transition and presented to the Negative Trigger-In input 40 will initiate activity in succeeding stages. Typically this input would be connected to a point in the vehicle electrical system which is connected through a triggering switch which completes an electrical circuit to the vehicle chassis. Similarly, when U1-C is enabled, a signal making low to high transition and presented to the Positive Trigger-In input will initiate activity in succeeding stages. These alternative trigger configurations allow for negative and positive ground configurations, and typically will be derived from existing wiring of the vehicle, such as a door/courtesy light circuit.

Timing circuit U3, together with timing components C1 and R1, forms a delay circuit which is triggered by U1-C or U1-D according to the triggers described above. This delay circuit, when triggered, drives the audio alarm piezo buzzer 44. This buzzer provides an audible indication that the module has been triggered, as explained above.

Circuit U4 provides an approximately 30-second delay when triggered. This delay allows the hijacker to drive the vehicle a safe distance from the crime scene before the ignition system is disabled. Timing component R2 and C2 establish the delay. Element R2 may be variable, allowing the user to adjust this period.

Circuit U5 establishes a delay of approximately one second when triggered following the delay period of U4. This one-second pulse drives relay K1, which in turn sends a polarized pulse to the under-hood relay unit 16. The one-second pulse is of sufficient duration to enable and latch the relay unit so as to interrupt current flow in the engine ignition system.

It will be understood that the above description pertains to only several embodiments of the present invention. That is, the description is provided by way of illustration and not by way of limitation. The invention is further characterized according to the following claims.

What is claimed is:

1. Vehicle security system for a motor vehicle of the type having an electronic ignition module and an engine-ignition-controlling microprocessor, the microprocessor for controlling the module for provision of an ignition signal to the vehicle engine, the vehicle having a vehicle trigger circuit for issuing a vehicle component status trigger signal indicative of the status of components of the vehicle, the system being cycleable between an armed alarm state in which unauthorized vehicle use evokes an alarm situation in which the vehicle engine ignition is defeated and authorized use does not evoke said alarm situation, and a disarmed alarm state in which use does not evoke an alarm situation, the alarm situation being triggered in response to detection of said trigger signal during the armed alarm state, the system comprising user interface means for cycling the system between said armed and disarmed state, engine-ignition-kill module means for connection between said electronic ignition module and said microprocessor, main control module means including a main trigger circuit for receipt of a vehicle trigger signal from said vehicle trigger circuit, said main control module means controlling the operation of the engine-ignition-kill module means in response to said vehicle trigger signal during said armed state, said main control module means being user controllable via said user interface means, and wherein said main control module means issues an ignition kill signal to said engine-ignition-kill module means to interrupt said engine ignition between said electronic ignition module and said engine-ignition-controlling microprocessor in response to said vehicle trigger signal, to kill said engine ignition during said armed alarm state, wherein said main control module means further includes a system interrupt device for resetting said system and permitting authorized engine ignition after said engine ignition has been interrupted.

2. The system of claim 1 wherein said main control module means further includes a device for enabling said reset only after said engine ignition has been interrupted and after said system has been cycled to said disarmed state via said interface means.

3. The system of claim 2 wherein said means for indication of system status is an LED, and said user interface means is a disguisable microswitch.

4. The system of claim 2 wherein said trigger circuit means comprises a brake switch, emergency brake switch, back-up switch, park/neutral switch, and/or clutch switch circuit of the vehicle.

5. The system of claim 2 wherein said engine-ignition-kill module means comprises a self-latching device and is installed between said electronic ignition module and said engine microprocessor.

6. The system of claim 2 wherein said trigger circuit is an anti-theft unauthorized event trigger circuit.

7. The system of claim 6 further comprising anti-hijack module means for providing anti-hijack protection, hijack arming means for arming said anti-hijack module means, and means for cycling said system between anti-theft armed and anti-hijack armed status.

8. The system of claim 6 further comprising anti-hijack module means for providing anti-hijack protection, and wherein said system is for use in a vehicle having an anti-hijack unauthorized-event trigger circuit, said system further comprising an anti-hijack unauthorized-event trigger circuit means for receipt of a trigger signal from said vehicle anti-hijack unauthorized-event trigger circuit, wherein said anti-hijack module means comprises an adapter arrangement for insertion between said anti-theft trigger circuit and said main control module means, between said means for indication of system status and said main control module means, and between said user interface means and said main control module means.

9. The system of claim 8 wherein said means for indication of system status includes means for cycling between anti-theft armed and anti-hijack armed states.

10. The system of claim 1 further comprising falsity means for causing intentionally false indication of an empty fuel tank, said falsity means being responsive to detection by said main control module means of a trigger event and causing interruption of said engine ignition.

11. The system of claim 7 wherein said user interface means is a multi-input device and wherein said anti-hijack module further comprises means for selectively passing either anti-theft or anti-hijack trigger signals from said vehicle trigger circuits to said main control module means depending upon input from said user interface means.

12. The system of claim 1 wherein said kill relay module has a by-pass pin-out which enables the user to by-pass said ignition interruption in the event of system malfunction.

13. The system of claim 1 wherein said main control module means further comprises a reset button, wherein said user interface means further comprises means for resetting said system and to permit engine ignition, and wherein said reset button is effective only when said system has been cycled into a disarmed state via said user interface means.

14. The system of claim 7 further comprising a door or courtesy light circuit wherein said circuit constitutes an anti-hijack unauthorized-event trigger circuit and said anti hijack module is installed between said anti-theft unauthorized-event trigger circuit and said main control module.

15. The system of claim 7 further comprising engine kill time delay means for delaying said main control module means from causing said interruption of engine ignition.

16. The system of claim 15 further comprising an audible alarm means for indication of receipt of an anti-hijack trigger signal.

17. Vehicle security system for a vehicle of the type having an engine ignition controlling microprocessor and an engine ignition module under the control of the microprocessor for provision of an ignition signal to the vehicle engine, the system comprising user interface means for cycling the system between an armed status and a disarmed status, means for indication of said system status, engine-ignition-kill module means, said engine-ignition-kill module means being for electronically intervening between said engine electronic ignition module and said engine microprocessor, anti-theft trigger circuit, anti-hijack trigger circuit, anti-hijack module means for receipt of an anti-hijack trigger signal from said anti-hijack trigger circuit, said anti-hijack module means for permitting the vehicle to be operated with the engine running while said system is in said armed state, main control module means for receipt of an anti-theft trigger signal from said anti-theft trigger circuit and for receipt of an anti-hijack trigger signal from said anti-hijack trigger circuit, said main control module means for controlling the operation of the engine-ignition-kill module means in response to said anti-theft trigger signal for killing engine ignition for anti-theft protection, said main control module means for controlling the operation of the engine-ignition-kill module means in response to said anti-hijack trigger signal for killing engine ignition for anti-hijack security protection, said main control module means being user-controllable via said user interface means, said main control module means displaying system status via said means for indication of system status, and said anti-hijack trigger circuit causing said engine-ignition-kill module means to disable said engine ignition when said system is armed and while said vehicle engine is running, in response to said anti-hijack trigger signal.

18. In a vehicle security system for a vehicle of the type having an engine ignition-controlling microprocessor and an engine ignition module under the control of the microprocessor for provision of an ignition signal to the vehicle engine, the system comprising means for indication of system status, user interface means for cycling the system between said armed and disarmed state, engine-ignition-kill module means, said engine-ignition-kill module means being for electronically intervening between said engine electronic ignition module and said engine microprocessor, main control module means including main trigger circuit means for receipt of a trigger signal from an anti-theft trigger circuit, said main control module means for controlling the operation of the engine-ignition-kill module means in response to a trigger signal received by said main trigger circuit means, said main control module means being user-controllable via said user interface means, and wherein said main control module means causes said engine-ignition-kill module means to prevent engine ignition in response to a trigger signal from said trigger circuit means, and wherein a signal from said user interface means is required to reset the system and permit engine ignition after the engine ignition has been prevented, the improvement comprising an anti-hijack module means having anti-hijack unauthorized-event trigger circuit means for receipt of a trigger signal from an anti-hijack trigger circuit and for disabling said main control module means for anti-hijack security protection.

19. The system of claim 18 wherein said anti-hijack trigger circuit is for issuing a vehicle interference trigger signal indicative of human interaction with a component of the vehicle body, mode cycling means for cycling the system between an anti-theft armed state and an anti-hijack armed state, said anti-hijack unauthorized-event trigger circuit means issuing a disable signal to said main control module means to kill ignition of the vehicle engine while the engine is running in response to said vehicle interference trigger signal when said anti-hijack system is in said armed state.

20. Vehicle security system for a motor vehicle of the type having an electronic ignition module and an engine-ignition-controlling microprocessor for controlling the module for provision of an ignition signal to the vehicle engine, the vehicle having a trigger circuit, the system being cycleable between an armed state in which unauthorized use evokes an alarm situation and a disarmed state in which unauthorized use does not evoke an alarm situation, the system comprising means for indication of system status, user interface means for cycling the system between said armed and disarmed state, user reset means for issuing a reset signal, engine-ignition-kill module means, said engine-ignition-kill module means being for interrupting said ignition signal between said electronic ignition module and said microprocessor, main control module means including a main trigger circuit for receipt of a vehicle trigger signal from said vehicle trigger circuit, said main control module means for controlling the operation of the engine-ignition-kill module means in response to said vehicle trigger signal, said main control module means being user-controllable via said user interface means, and said main control module means displaying said system status via said means for indication, and wherein when said main control module means is for causing said engine-ignition-kill module means to interrupt engine ignition in response to said vehicle trigger signal, wherein said main control module means further includes a system interrupt device actuated by said reset signal from said user interface means for resetting said system and permitting engine ignition after said engine ignition has been interrupted, wherein said main control module means further includes a device for enabling said reset only after said engine ignition has been interrupted and after said system has been cycled to said disarmed state via said interface means.

21. The system of claim 20 wherein said trigger circuit means comprises a brake switch, emergency brake switch, back-up switch, park/neutral switch, and/or clutch switch circuit of the vehicle.

22. The system of claim 20 wherein said engine-ignition-kill module means comprises a self-latching device and is installed between said electronic ignition module and said engine microprocessor.

23. The system of claim 20 wherein said trigger circuit is an anti-theft unauthorized event trigger circuit.

24. The system of claim 20 further comprising anti-hijack module means for providing anti-hijack protection including while said engine is running.

25. The system of claim 23 further comprising anti-hijack module means for providing anti-hijack protection, and wherein said system is for use in a vehicle having an anti-hijack unauthorized-event trigger circuit, said system further comprising an anti-hijack unauthorized-event trigger circuit means for receipt of a trigger signal from said vehicle anti-hijack unauthorized-event trigger circuit, wherein said anti-hijack module means comprises an adapter arrangement for insertion between said anti-theft trigger circuit and said main control module means, between said means for indication of system status and said main control module means, and between said user interface means and said main control module means.

26. The system of claim 25 wherein said means for indication of system status includes means for cycling between anti-theft armed and anti-hijack armed states.

27. Vehicle security system for a motor vehicle of the type having an electronic ignition module and an engine-ignition-controlling microprocessor for controlling the module for provision of an ignition signal to the vehicle engine, the vehicle having a trigger circuit, the system being cycleable between an armed state in which unauthorized use evokes an alarm situation and a disarmed state in which unauthorized use does not evoke an alarm situation, the system comprising means for indication of system status, user interface means for cycling the system between said armed and disarmed state, user reset means for issuing a reset signal, engine-ignition-kill module means, said engine-ignition-kill module means being for interrupting said ignition signal between said electronic ignition module and said microprocessor, main control module means including a main trigger circuit for receipt of a vehicle trigger signal from said vehicle trigger circuit, said main control module means for controlling the operation of the engine-ignition-kill module means in response to said vehicle trigger signal, said main control module means being user-controllable via said user interface means, and said main control module means displaying said system status via said means for indication, wherein when said main control module means is for causing said engine-ignition-kill module means to interrupt engine ignition in response to said vehicle trigger signal, wherein said main control module means further includes a system interrupt device actuated by said reset signal from said user interface means for resetting said system and permitting engine ignition after said engine ignition has been interrupted, wherein said main control module means further comprises a reset button, wherein said user interface means further comprises means for resetting said system and to permit engine ignition, and wherein said reset button is effective only when said system has been cycled into a disarmed state via said user interface means, and further comprising anti-hijack module means for providing anti-hijack protection, and wherein said system is for use in a vehicle having an anti-hijack unauthorized-event trigger circuit, said system further comprising an anti-hijack unauthorized-event trigger circuit means for receipt of a trigger signal from said vehicle anti-hijack unauthorized-event trigger circuit, wherein said anti-hijack module means comprises an adapter arrangement for insertion between said anti-theft trigger circuit and said main control module means, between said means for indication of system status and said main control module means, and between said user interface means and said main control module means.

28. The system of claim 27 wherein said means for indication of system status includes means for cycling between anti-theft armed and anti-hijack armed states.

29. The system of claim 28 wherein said user interface means is a multi-input device and wherein said anti-hijack module further comprises means for selectively passing either anti-theft or anti-hijack trigger signals from said vehicle trigger circuits to said main control module means depending upon input from said user interface means.

30. The system of claim 27 wherein said kill relay module has a by-pass pin-out which enables the user to by-pass said ignition interruption in the event of system malfunction.

31. The system of claim 27 wherein said main control module means further comprises a reset button, wherein said user interface means further comprises means for resetting said system and to permit engine ignition, and wherein said reset button is effective only when said system has been cycled into a disarmed state via said user interface means.

32. The system of claim 27 further comprising engine kill time delay means for delaying said control module means from causing said interruption of engine ignition.

33. The system of claim 27 further comprising an audible alarm means for indication of receipt of an anti-hijack trigger signal.

34. The system of claim 27 further comprising means for causing false indication of an empty fuel tank, said means for causing indication of an empty fuel tank being responsive to detection by said main control module means of a trigger event and causing interruption of said engine ignition.

\* \* \* \* \*